No. 731,284. PATENTED JUNE 16, 1903.
J. T. COUSINS.
TROLLEY ARM.
APPLICATION FILED MAY 12, 1902.
NO MODEL.
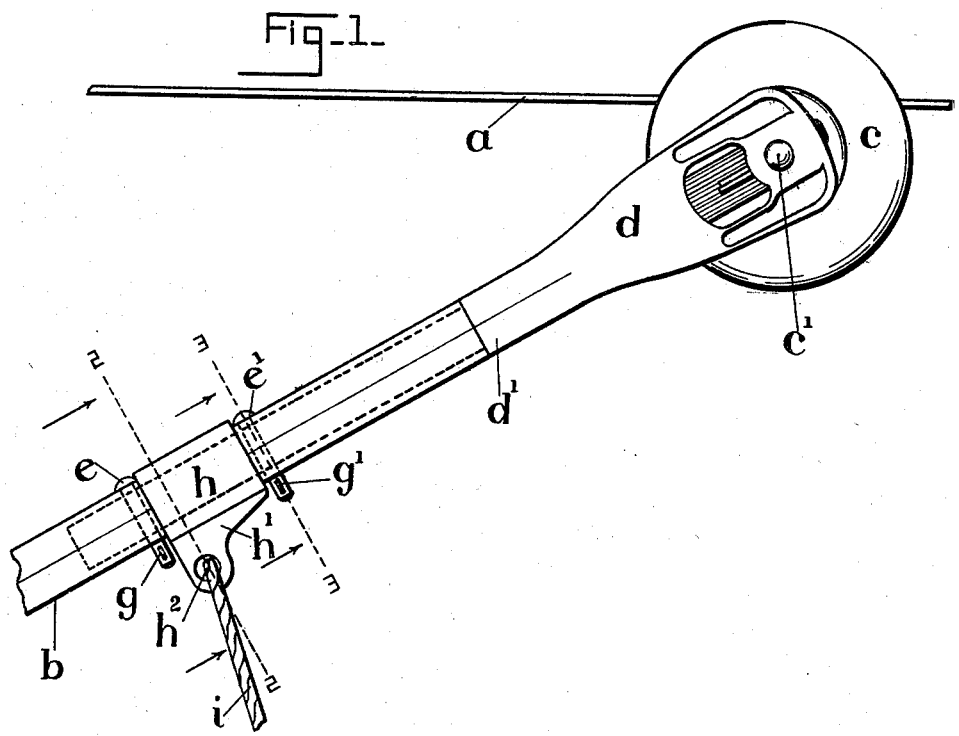
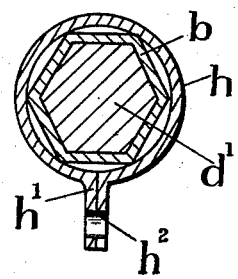
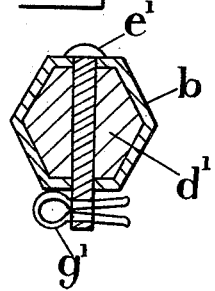
WITNESSES
Frank S. Dewire
May F. Ritchie.
INVENTOR,
Judson T. Cousins,
BY HIS ATTORNEY,
Frank H. Allen No. 731,284. Patented June 16, 1903.

UNITED STATES PATENT OFFICE.

JUDSON T. COUSINS, OF NORWICH, CONNECTICUT, ASSIGNOR OF ONE-HALF TO FRED W. ESTABROOK, OF NORWICH, CONNECTICUT.

TROLLEY-ARM.

SPECIFICATION forming part of Letters Patent No. 731,284, dated June 16, 1903.

Application filed May 12, 1902. Serial No. 106,946. (No model.)

*To all whom it may concern:*

Be it known that I, JUDSON T. COUSINS, a citizen of the United States, residing at Norwich, in the county of New London and State of Connecticut, have invented certain new and useful Improvements in Trolley-Arms, of which the following is a full, clear, and exact description.

This invention relates to trolley-arms; and my chief object is to so improve the construction of this class of devices that the delays and annoyance now incident to repairing of the trolley-wheel may be avoided.

Heretofore whenever the trolley-wheel became worn out or broken it has been customary to pull the trolley-arm down as far as possible and then remove the old wheel and substitute a new one; but it often happens that the pivot on which the wheel rotates is so rusted or bent that considerable time is wasted in the operation of changing the wheels, and meanwhile the car, and perhaps the entire trolley system, is blocked and delayed. My present invention seeks to overcome this annoying and expensive result and makes it possible to substitute a new trolley-wheel for the old one almost instantly, as I shall explain in detail.

The annexed drawings illustrate my said invention, Figure 1 being a side elevation of the free end of a trolley-arm having the trolley proper secured therein by my newly-invented means. Fig. 2 is an enlarged cross-sectional view taken on line 2 2 of Fig. 1, and Fig. 3 is a similar view taken on the line 3 3 of the same figure.

In the drawings the letter $a$ indicates the trolley-wire, $b$ the trolley-arm, and $c$ the trolley or wheel that follows the said wire $a$. The wheel $c$ is mounted to rotate on a pivot-bolt $c'$ in a head $d$, which head is formed as a part of a shank $d'$, that is angular in cross-section, as is best seen in Figs. 2 and 3. As here shown, the said shank is hexagonal in cross-section; but the exact form is not material, it being only essential that the said shank shall be of such shape that it cannot revolve in the arm $b$. The said arm is tubular and of such size and shape that the shank $d'$ may be readily slipped into it.

In order to prevent the accidental separation of the shank $d$ and arm $b$, I drill through the said arm and shank at two different points, as seen in Fig. 1, and then lock the said parts together by means of headed bolts $e\ e'$, these bolts being held in place by cotter-pins $g\ g'$.

Between the heads of the bolts $e\ e'$ I mount loosely on the trolley-arm a circular collar $h$, formed with a fin $h'$, that is provided with an eye $h^2$, in which is tied the usual cord $i$, by means of which the trolley-arm may be drawn down or otherwise adjusted.

Whenever it is necessary or desirable that the trolley-wheel shall be removed, either for repairs or for any other purpose, it may be quickly done by withdrawing the cotter-pins $g\ g'$ and removing the bolts $e\ e'$, thus leaving the shank $d'$ free to be slipped out of the hollow end of the arm $b$. Another complete head and trolley may then be slipped into the trolley-arm and quickly secured in place by means of the said bolts and cotter-pins, and the broken trolley may be sent to the shop and repaired at any convenient time, the delay incident to the changing of the trolley-heads being not more than two or three minutes.

It should be noted that the headed bolts $e\ e'$ serve the double purpose of binding the shank of the trolley-head securely to the arm $b$ and also to limit the position of the collar $h$ on said arm—that is to say, the said bolt-heads prevent the collar from slipping longitudinally on said arm, but they leave the collar free to rock or rotate on said arm.

My improvements add very little to the cost of construction of this class of devices, yet they effectually overcome the annoying and expensive defects of the system now most commonly used.

Having described my invention, I claim—

The combination with a trolley-arm angular in cross-section and a trolley-head having a shank slidingly and non-rotatably held within said arm, the bolts passed through said shank and arm, means passed through said bolts for adjustably securing them in position and a collar loosely mounted upon said arm between said bolts.

Signed at Norwich, Connecticut, this 3d day of May, 1902.

JUDSON T. COUSINS.

Witnesses:
FRANK H. ALLEN,
FRANK S. DUVIRE.